United States Patent
Huot et al.

(10) Patent No.: US 10,442,505 B2
(45) Date of Patent: Oct. 15, 2019

(54) OFFSHORE LIFTING OF A LOAD WITH HEAVE COMPENSATION

(71) Applicant: SAIPEM S.P.A., San Donato Milanese (IT)

(72) Inventors: Emmanuel Huot, St Martin de Nigelles (FR); Carlo Chiodini, Maniago (IT); Liborio Moceri, Cherisy (FR)

(73) Assignee: SAIPEM S.P.A., Milan (IT)

( * ) Notice: Subject to any disclaimer, the term of this patent is extended or adjusted under 35 U.S.C. 154(b) by 193 days.

(21) Appl. No.: 15/522,860

(22) PCT Filed: Oct. 29, 2015

(86) PCT No.: PCT/EP2015/075185
§ 371 (c)(1),
(2) Date: Apr. 28, 2017

(87) PCT Pub. No.: WO2016/066776
PCT Pub. Date: May 6, 2016

(65) Prior Publication Data
US 2017/0327192 A1    Nov. 16, 2017

(30) Foreign Application Priority Data

Oct. 31, 2014 (GB) .................... 1419394.0

(51) Int. Cl.
*B63B 27/22* (2006.01)
*B63B 27/10* (2006.01)
(Continued)

(52) U.S. Cl.
CPC .............. *B63B 27/22* (2013.01); *B65G 65/06* (2013.01); *B66C 13/02* (2013.01); *B66C 23/53* (2013.01); *A61G 3/06* (2013.01); *B66B 9/00* (2013.01)

(58) Field of Classification Search
CPC ......... B66C 13/02; B66C 13/06; B66C 13/08; B66C 13/18; B66C 23/52; B66C 23/54; B63B 27/10
See application file for complete search history.

(56) References Cited

U.S. PATENT DOCUMENTS 2,911,111 A * 11/1959 Grove .................... B66C 13/18
212/261
2,961,102 A * 11/1960 Pitman .................. B66C 13/18
212/238
(Continued)

FOREIGN PATENT DOCUMENTS

FR     2 403 263 A1    4/1979
GB     1 511 428 A     5/1978
(Continued)

OTHER PUBLICATIONS

Search Report dated Apr. 29, 2015, by the United Kingdom Intellectual Property Office in corresponding United Kingdom Patent Application No. 1419394.0. (3 pages).
(Continued)

*Primary Examiner* — Michael E Gallion
(74) *Attorney, Agent, or Firm* — Buchanan Ingersoll & Rooney PC

(57) ABSTRACT

A lifting apparatus comprises: a base part, a lifting rope, a sheave assembly, a first rotatably mounted sheave, around which the rope passes and from which the rope extends downwardly to a load, a second rotatably mounted sheave and a drive for moving the sheave assembly. The sheave assembly is mounted for pivotal movement relative to the base part about an axis of pivoting spaced from the axis of rotation of the first sheave and coincident with the axis of rotation of the second sheave. During movement of the load relative to the base part, the first sheave is moved by the drive to compensate for that relative movement, the move-
(Continued)

ment of the first sheave being such that the vertical component of the movement of the first sheave relative to the load is less than the vertical component of the movement of the base part relative to the load.

19 Claims, 2 Drawing Sheets

(51) Int. Cl.
*B66C 13/02* (2006.01)
*B66C 23/52* (2006.01)
*B66C 23/53* (2006.01)
*B65G 65/06* (2006.01)
*A61G 3/06* (2006.01)
*B66B 9/00* (2006.01)

(56) References Cited

U.S. PATENT DOCUMENTS

| | | | | |
|---|---|---|---|---|
| 3,150,860 A | * | 9/1964 | Nelson | B66D 1/48 114/244 |
| 3,154,199 A | * | 10/1964 | Balogh | B66C 23/54 212/231 |
| 3,273,721 A | * | 9/1966 | Brunton | B66C 13/18 212/261 |
| 3,591,022 A | * | 7/1971 | Polyakov | B66C 13/02 212/309 |
| 4,021,019 A | * | 5/1977 | Sanders | B66C 13/02 212/308 |
| 4,544,137 A | * | 10/1985 | Johnson | B66C 13/02 212/308 |
| 5,381,909 A | * | 1/1995 | Warnan | B63B 21/66 114/244 |
| 6,868,902 B1 | * | 3/2005 | Roodenburg | E21B 19/22 166/346 |
| 7,341,157 B2 | * | 3/2008 | Slobogean | B66C 23/00 212/250 |
| 8,800,462 B2 | * | 8/2014 | Fenini | B63B 21/16 114/200 |
| 9,463,963 B2 | * | 10/2016 | Hey | B66C 23/52 |
| 9,790,062 B2 | * | 10/2017 | Roodenburg | B66C 23/52 |
| 10,106,995 B2 | * | 10/2018 | Snell | B66C 23/201 |
| 2002/0129755 A1 | * | 9/2002 | Hagen | B66C 13/02 114/268 |
| 2002/0166998 A1 | * | 11/2002 | Selcer | B63B 21/66 254/333 |
| 2005/0191165 A1 | * | 9/2005 | Willis | B63B 21/04 414/803 |
| 2009/0232625 A1 | * | 9/2009 | Almeda, Jr. | B66C 23/52 414/139.6 |
| 2011/0176874 A1 | * | 7/2011 | Hebert | B65H 51/10 405/158 |
| 2018/0266195 A1 | * | 9/2018 | Odru | F16H 23/00 |
| 2018/0313174 A1 | * | 11/2018 | Lepreux | B66C 13/02 |

FOREIGN PATENT DOCUMENTS

| | | |
|---|---|---|
| GB | 2 485 570 A | 5/2012 |
| JP | 2003-201091 A | 7/2003 |

OTHER PUBLICATIONS

International Search Report (PCT/ISA/210) dated Jan. 8, 2016, by the European Patent Office as the International Searching Authority for International Application No. PCT/EP2015/075185.

Written Opinion (PCT/ISA/237) dated Jan. 8, 2016, by the European Patent Office as the International Searching Authority for International Application No. PCT/EP2015/075185.

* cited by examiner

OFFSHORE LIFTING OF A LOAD WITH HEAVE COMPENSATION

FIELD OF THE INVENTION

The present invention relates to heave compensation in an apparatus and method for use in offshore lifting and/or lowering of a load.

BACKGROUND OF THE INVENTION

It is often necessary to lift or lower loads offshore. For example a lifting apparatus on a floating vessel may be employed to lift a load rHsting on the seabed with a rope extending from the lifting apparatus to the load. In a typical arrangement the rope is wound on a winch mounted on the vessel and passes over one or more sheaves rotatably mounted on the lifting apparatus. The rope extends downwardly from the final sheave to the load to be lifted. Especially when lifting heavy loads it is important to avoid sudden changes in the tension of the lifting rope and a lifting operation typically proceeds slowly. A particular difficulty that may arise, however, as a result of heave of the floating vessel, is that there is relative vertical movement between the floating vessel and the load to be lifted; without any compensation for such relative movement, very substantial forces can arise in the rope.

If the load has not yet been lifted from a rest position but the rope is already under tension, and the vessel is caused by the sea to rise, then the rope tension increases substantially as the rope seeks to impart a substantial upward acceleration to the load which has high inertia. If the load has already been lifted from a rest position, and the vessel is caused by the sea to rise, then the rope resists that and again tension in the rope increases considerably. If the load has already been lifted from a rest position, and the vessel is caused by the sea to descend, then the rope tension decreases substantially as the load will not descend as quickly as the vessel due to drag (the hydrodynamic forces on the load). In this situation there is a risk of rope slack and subsequent shock loading of the rope. Consequently it is common to provide some kind of heave compensation system when lifting a load.

In a known heave compensation system, where a rope passes from the lifting apparatus to the load, it is known to adjust the effective length of the rope to compensate for heave. For example the rope may extend from the load over a rotatable sheave and then along a serpentine path defined by further sheaves, one of which may be drivingly movable to make the path more or less serpentine. Taking as an example the case where the lifting apparatus sinks, then, to avoid a sudden reduction in tension in the rope, the movable sheave is driven to make the rope path more serpentine so that the serpentine portion of the rope path is lengthened; therefore rope is caused to pass over the rotatable sheave in the direction from the load to the serpentine path. Similarly, if the lifting apparatus rises, to avoid a sudden increase in rope tension, the movable sheave is driven to make the serpentine portion of the rope path shorter, and rope is caused to pass over the rotatable sheave in the direction from the serpentine path to the load. In that way, the variation in the tension in the cable can be reduced or eliminated, but the cable is exposed to reciprocating movement over a sheave with a period equal to the period of the heave of the vessel.

Such reciprocating movement over a sheave of a cable that is under substantial tension tends to cause fatigue in the cable and, to accommodate that, a higher specification of rope is required.

The present invention seeks to mitigate the above-mentioned problem arising from fatigue in a lifting rope.

SUMMARY OF THE INVENTION

The present invention provides a lifting apparatus for use in offshore lifting or lowering of a load, the lifting apparatus incorporating a heave compensation arrangement and comprising:

a base part;

a lifting rope extending from the base part for bearing at least some of the weight of the load;

a sheave assembly;

a first sheave which is rotatably mounted on the sheave assembly, around which, in use, the rope passes and from which, in use, the rope extends downwardly for connection to a load;

the sheave assembly being mounted for pivotal movement relative to the base part of the lifting apparatus about an axis of pivoting spaced from the axis of rotation of the first sheave, the relative movement resulting in movement of the axis of rotation of the first sheave relative to the base part in a direction having at least a major component that is vertical;

a drive for moving the sheave assembly; and the apparatus being arranged such that in use during movement of the load relative to the base part of the lifting apparatus, the first sheave is moved by the drive to compensate for that relative movement, the movement of the first sheave being such that the vertical component of the movement of the first sheave relative to the load is less than the vertical component of the movement of the base part of the lifting apparatus relative to the load.

It should be understood that the "base part" of the lifting apparatus is that part which may be, and would usually be, fixedly mounted on a body, which may be, for example, a floating vessel. The base part may for example be mounted on the deck of a vessel. Whilst the "base part" may often be the lowest part of the lifting apparatus, it also may not be, and the term "base" should not be taken as implying any particular relative position in terms of height. Also the "base part" may comprise a minor part of the lifting apparatus or it may comprise a major part; the sheave assembly may be the main part and/or the only other part of the lifting apparatus.

By restricting the vertical movement of the first sheave relative to the load to less than the vertical movement of the base part of the lifting apparatus relative to the load, the amount of movement of rope over the first sheave is reduced as is the speed of such movement. As a result the rate of bending and straightening of the rope and stresses in the rope caused by that are reduced and less heat is generated inside the rope. Thus, the vulnerability of the rope to wear and fatigue is reduced. The term "rope" as used in this specification refers to any flexible elongate member serving the purpose of a rope. Typically the "rope" will be a multi-strand woven steel cable but the invention is not limited to such cables. Furthermore the advantages referred to above can be achieved in a simple construction.

Where reference is made herein to a "first sheave", and, in a preferred arrangement also to a "second sheave" it should be understood that it is within the scope of the invention for there to be just one single sheave, namely the first sheave.

Preferably the vertical movement of the first sheave is such that there is substantially no rotation of the first sheave about its axis; in practice, it may prove difficult to eliminate all rotation of the first sheave, but it is preferred that the vertical component of the movement of the first sheave relative to the load is less than 30%, and more preferably less than 5% of the vertical component of the movement of the base part of the lifting apparatus relative to the load. In such a case, even fairly rapid and large amplitude movements of the lifting apparatus relative to the load result in only small and slow movements of the rope over the first sheave.

Preferably the axis of pivoting of the sheave assembly is parallel to the axis of rotation of the first sheave. The range of pivotal movement of the assembly preferably includes a position at which the axis of rotation of the first sheave is at approximately the same level as the axis of pivoting of the sheave assembly; at a position where the two axes are level, and if the axes are horizontal as is usually the case, the pivoting movement results in the axis of rotation of the first sheave moving in a directly vertical direction. Preferably the full range of pivoting movement of the sheave assembly is less than 45 degrees and in that case even at its extremes of that range of movement, the axis of rotation of the first sheave moves in a direction having a major vertical component; more preferably the full range of pivoting movement is less than 30 degrees. The full range of pivoting movement may be more than 15 degrees. Whilst it is possible for the full range of pivoting movement to be more than 15 degrees, the full range of pivoting movement may be less than 15 degrees. The range of vertical movement of the axis of rotation of the first sheave is preferably more than 1 m. In an embodiment of the invention described below it is about 4 m which corresponds to an angle of pivoting of about 23 degrees.

In an embodiment of the invention described below, the range of pivotal movement of the assembly includes a lowest position of the first sheave at which the axis of rotation of the first sheave is at approximately the same level as the axis of pivoting of the sheave assembly and a highest position at which the axis of rotation of the first sheave is above the axis of pivoting of the sheave assembly.

Preferably the sheave assembly is mounted such that it has a single degree of freedom of movement relative to the base part. The sheave assembly is preferably mounted for pivotal movement about a fixed axis relative to the base part. In the case where the base part is fixedly mounted on a body, the fixed axis of pivoting is preferably fixed relative to that body.

In a preferred embodiment of the invention, a second sheave is rotatably mounted on the assembly. The second sheave may have an axis of rotation parallel to the axis of rotation of the first sheave; thus the axis of rotation of the second sheave may be substantially horizontal. Preferably, the axis of rotation of the second sheave is coincident with the axis of pivoting of the sheave assembly; in that case the position of the second sheave relative to the base part of the lifting apparatus is unchanged when the sheave assembly pivots and therefore the path of a lifting rope extending from the base part of the lifting apparatus to the second sheave remains the same during pivoting of the sheave assembly. This again reduces the changes in stress in the rope and vulnerability of the rope to wear and fatigue is reduced.

The first and second sheaves may have substantially the same diameter.

The first sheave may be rotatable about a further independent axis of rotation. The further independent axis of rotation of the first sheave may be orthogonal to the first mentioned independent axis of rotation of the first sheave. The further independent axis of rotation may be positioned such that, in use, the first sheave is able to rotate about the further independent axis to positions in which the cable path around the sheave and the cable path from the sheave towards the load remain substantially coplanar. The further independent axis of rotation may be tangential to the periphery of the first sheave. With such an arrangement, in the case where the lifting apparatus is on a floating vessel, the stresses that the first sheave and the rope are subjected to by one another during pitching of the vessel can be significantly reduced. The sheave assembly may comprise a first part and a second part, the first sheave being rotatably mounted on the first part and the first part being rotatably mounted on the second part for rotation about the further independent axis. The invention may be applied to both active and passive heave compensation systems. The drive for moving the sheave assembly may thus be active or passive, but in either case may comprise a piston and cylinder assembly. In the case of a fully active system, hydraulic fluid is preferably pumped into or released from the cylinder under the control of an active control system. In the case of a fully passive system, the pressure in the cylinder may be maintained constant, for example by a pressurised gas store, so that the force exerted on the first sheave is substantially constant, thereby maintaining a substantially constant tension in the lifting rope. Another possibility is to provide a partly active and partly passive system.

In the case of an active or partly active system, the lifting apparatus may further comprise a control system for controlling the movement of the first sheave. Such a control system may receive inputs relating to one or more of lifting rope tension, movement of the lifting apparatus relative to the load, and wave movements. An output from the control system may control the drive for moving the sheave assembly.

The piston and cylinder assembly may be pivotally connected at one end to the base part of the lifting apparatus or to another support, such as a part of a floating vessel, on which the base part of the lifting apparatus is mounted and may be pivotally connected at the other end to the sheave assembly at a position spaced from the axis of pivoting of the sheave assembly. The piston and cylinder assembly preferably extends in a direction having a major vertical component. In that case the piston and cylinder assembly may be pivotally connected to the sheave assembly at a position closer to the axis of rotation of the first sheave than to the axis of pivoting of the sheave assembly. In a preferred embodiment of the invention described below the piston and cylinder assembly is pivotally connected to the sheave assembly at a position approximately ¾ of the distance from the axis of pivoting of the sheave assembly to the axis of rotation of the first sheave. Whilst it is within the broadest scope of the present invention for there to be a further piston and cylinder assembly connected to the sheave assembly on the opposite side of its axis of pivoting to the first sheave, that is not preferred since it complicates the apparatus.

The first sheave preferably provides the final direction-changing guide for the rope before it leaves the lifting apparatus. In such a case, the result of reducing or eliminating rotation of the first sheave during heave is that there are no other direction-changing rope guides which do not benefit from that effect. As will be understood, any rope guide on the inboard side of the first sheave benefits from the compensating movement of the first sheave, but if there is a direction-changing guide on the outboard side of the first sheave, that does not benefit. It is therefore preferred that there are no such guides and that in use the lifting rope extends directly from the load to the first sheave.

Usually, the lifting apparatus is mounted on a vessel and the load is static, being supported on or above the seabed; in that case it is the heaving movement of the vessel for which there is a need for compensation. The invention is, however, also applicable to the case where the lifting apparatus is mounted on a fixed support, for example on the seabed or a pier or other static structure, and the load is floating or on a floating vessel; in that case it is the heaving movement of the load for which there is a need for compensation. Also the invention is applicable to the case where both the lifting apparatus and the load are floating so that both are subject to heaving movements.

The present invention further provides a method for offshore lifting or lowering of a load with heave compensation, the method comprising the following steps:

providing the load to be lifted and a lifting apparatus that comprises: a base part; a lifting rope extending from the base part for bearing at least some of the weight of the load; a sheave assembly; and a first sheave which is rotatably mounted on the sheave assembly, around which the rope passes and from which the rope extends downwardly and is connected to the load;

moving the first sheave upwardly and downwardly to compensate for movement of the load relative to the base part of the lifting apparatus; and controlling the movement of the first sheave such that the vertical component of the movement of the first sheave relative to the load is less than 30% of the vertical component of the movement of the base part of the lifting apparatus relative to the load.

The controlling of the movement of the rotatably mounted first sheave may be active control or passive control.

The lifting apparatus may be mounted on a floating vessel. In that case the base of the lifting apparatus may move up and down.

The load may be resting on the seabed or on a structure resting on the seabed.

The load may be floating or on a floating vessel. In that case the load may move up and down.

The load may be lifted/lowered through the body of the sea.

The rotatably mounted first sheave may be moved upwardly and downwardly by pivoting the sheave assembly about a substantially horizontal axis spaced from the axis of rotation of the first sheave.

The range of pivotal movement of the first sheave may include a position at which the axis of rotation of the first sheave is at approximately the same level as the axis of pivoting of the sheave assembly.

The range of pivotal movement of the assembly may include a lowest position at which the axis of rotation of the first sheave is at approximately the same level as the axis of pivoting of the sheave assembly and a highest position at which the axis of rotation of the first sheave is above the axis of pivoting of the sheave assembly.

Preferably the rope extends in a straight path from the first sheave to the load. The straight path may be substantially vertical. Usually the path will be substantially vertical because usually the load is lifted by the lifting rope alone; it is however within the scope of the invention for there to be more than one lifting apparatus and/or more than one lifting rope and in those cases especially the rope may be inclined to the vertical.

The present invention further provides a method for offshore lifting or lowering of a load with heave compensation, the method employing the lifting apparatus of any of the forms defined above.

It will of course be appreciated that features described in relation to the method of the present invention may be incorporated into the apparatus of the invention and vice versa.

DESCRIPTION OF THE DRAWINGS

An embodiment of the present invention will now be described by way of example only with reference to the accompanying schematic drawings, of which.

DETAILED DESCRIPTION

Figure 1:
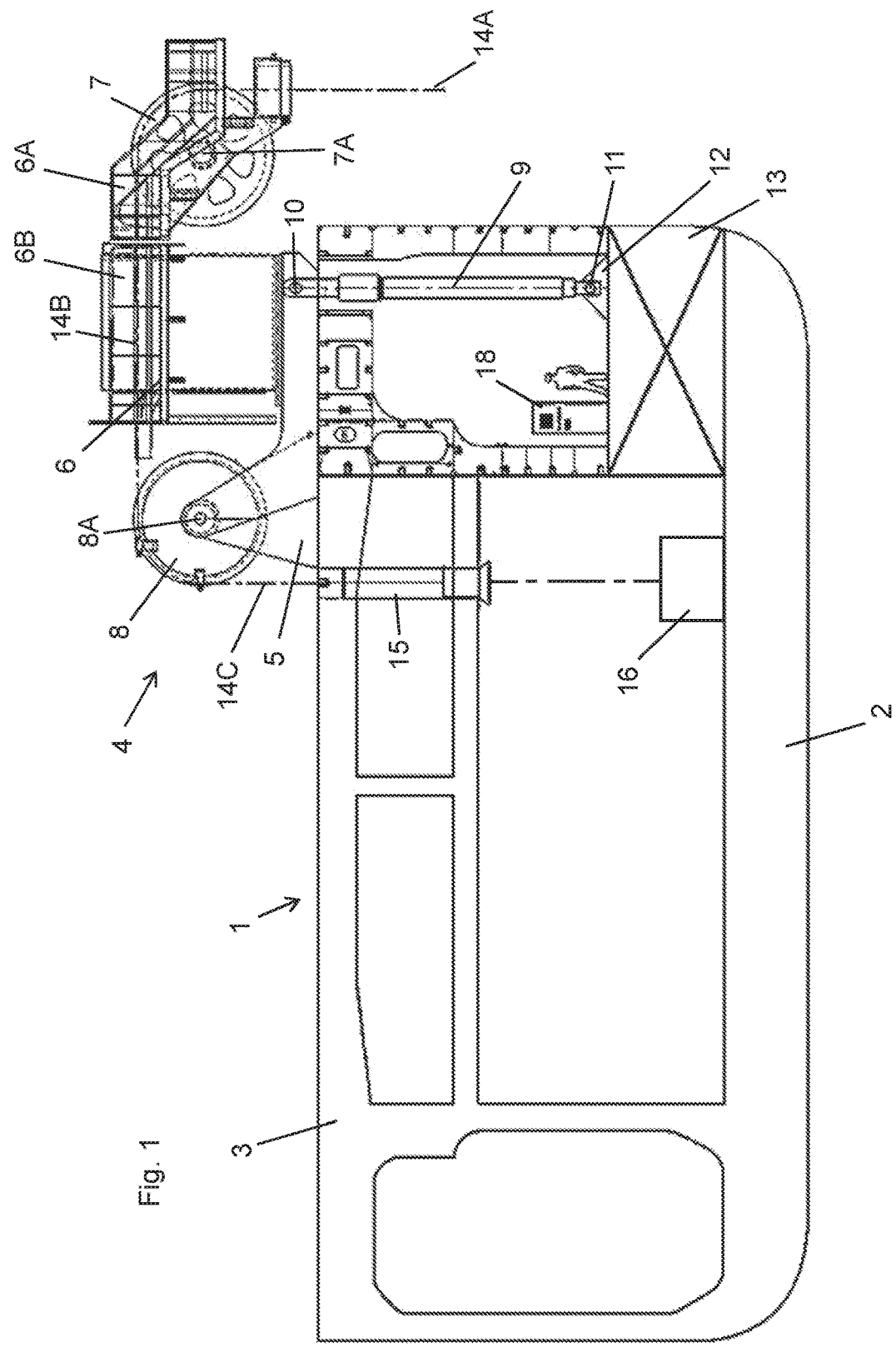
FIG. 1 is a cross-sectional view of a vessel hull fitted with lifting apparatus embodying the invention.

Referring first to FIG. 1, a floating vessel 1 has a hull 2 and a main deck 3 on which a lifting apparatus generally designated 4 is mounted. As shown in FIG. 1 the lifting apparatus 4 is mounted on one side of the vessel and in this example approximately midway along the length of the vessel.

The lifting apparatus 4 generally comprises a base part 5, secured to the main deck 3, and a sheave assembly 6 comprising a first sheave 7 and a second sheave 8. The sheaves 7 and 8 are rotatably mounted on the sheave assembly 6 for rotation about horizontal axes 7A and 8A parallel to each other and to the longitudinal axis of the vessel. The sheave assembly 6 is pivotally mounted on the base part 5 for pivoting movement about a pivot axis coincident with the axis of rotation 8A of the second sheave 8.

A pair of piston and cylinder assemblies 9, in the form of hydraulic jacks, are pivotally connected at their top ends at 10 to opposite sides of the sheave assembly 6 and at their bottom ends at 11 to a support 12 mounted on a reinforced part 13 of the hull 2. In FIG. 1 only one of the pair of jacks 9 is visible, since they are positioned one behind the other in the view of FIG. 1. A control system 18 is provided for controlling the flow of hydraulic fluid to and from the jacks 9.

FIG. 1 shows as a chain dotted line the path of the lifting rope 14 that is employed. FIG. 1 shows a portion 14A of the lifting rope path extending vertically down from the outboard side of the first sheave 7, a portion 14B extending horizontally inwardly from the first sheave 7 round the second sheave 8 and a portion 14C extending vertically downwardly through a passageway 15 in the vessel hull and down to a capstan winch indicated by block 16 in the drawing. The sheaves 7 and 8 are aligned so that the whole of the path of the rope 14 as just described is in one plane. As can be seen in FIG. 1 the lifting rope is guided around an angle of 90 degrees as it passes over each sheave 7 and 8.

Figure 2:
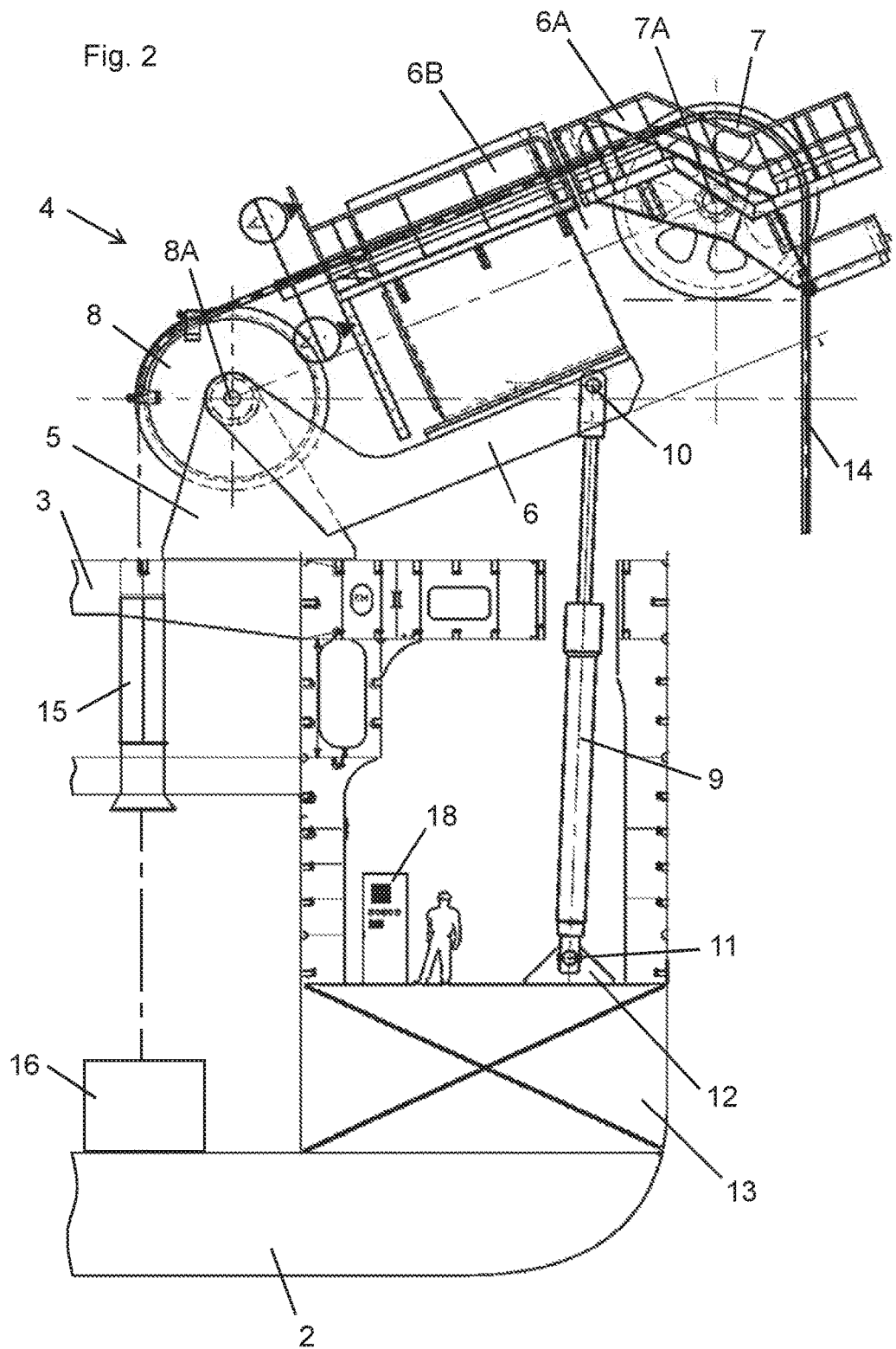
FIG. 2 is a view of the lifting apparatus viewed in the same direction as FIG. 1 but to a larger scale and showing a sheave assembly of the lifting apparatus in a different position from FIG. 1.

Use of the lifting apparatus 4 will now be described with reference also to FIG. 2 and in the context of lifting a load (not shown) from the seabed. Part of the lifting rope 14 is shown in FIG. 2 but it should be understood that when connected to the load the rope 14 would extend down into the sea with the vessel positioned so that the load is vertically below the portion 14A of the path of the lifting rope 14.

As will be well understood, if the vessel moves upwards or downwards, as a result for example of sea waves, then if there is no movement of the sheave assembly 6 relative to the vessel, the longitudinal strain in the rope will change very substantially and, to reduce or eliminate that effect, a heave compensation system is provided, by pivoting the sheave assembly 6 about its axis of pivoting 8A. The pivoting is driven by the pair of jacks 9 which are extended or retracted in unison as required. The range of pivoting movement in this particular example is shown in FIGS. 1 and 2, where FIG. 1 shows the sheave assembly in its lowest position and FIG. 2 shows the sheave assembly in its highest position. In the particular example shown, the angular range of pivotal movement is about 23 degrees with the rotational axes 7A and 8A at the same level when the sheave assembly is in its lowest position. In this particular example the total range of vertical movement of the axis 7A of the first sheave 7 is about 4 m.

The pivoting of the sheave assembly 6 is controlled to seek to maintain the first sheave 7 at a constant height above the seabed; if the vessel is moving up and down as a result of waves, then the sheave assembly 6 is pivoted about the axis 8A to seek to cancel out that movement. In the case of exact cancellation the first sheave 7 does not rotate; in the event of only partial cancellation, the first sheave 7 will rotate and the rope 14 will pass round the first sheave 7, but the amount and speed of the passage of the rope around the first sheave 7 will be substantially reduced from that which would apply if there were no pivoting of the sheave assembly 6. Furthermore, since the second sheave 8 rotates about the same axis 8A as the axis about which the sheave assembly 6 pivots, the pivoting of the sheave assembly 6 does not itself lead to any movement of the rope 14 around the second sheave 8. In those ways the exposure of the rope to stresses causing fatigue is very much reduced. Of course, when the load is being lifted or lowered the sheaves 7 and 8 will rotate and the rope will pass round both sheaves but that lifting or lowering can be carried out at a chosen speed and also does not lead to a repetitive, reciprocating passage of the same portion of the rope over a sheave, so it is not likely to cause fatigue.

If the vessel pitches, as a result for example of sea waves, the portion 14A of the path of the lifting rope 14 may no longer be substantially coplanar with the plane of the first sheave 7 as it is shown in the drawings; if this occurs high stresses will be introduced into the lifting rope and the first sheave at the point at which the portion 14A of the path of the lifting rope 14 meets the first sheave 7. To ensure that the portion 14A of the path of the lifting rope 14 remains substantially coplanar with the first sheave 7 and thus to avoid such stresses, the first sheave 7 can be mounted such that it is rotatable about a further independent axis of rotation. In the examples shown in FIG. 1 and FIG. 2, the further independent axis of rotation of the first sheave 7 is coincident with the portion 14B of the path of the lifting rope 14 and is provided by making a first part 6A of the sheave assembly 6 rotatable about the further independent axis relative to a second part 6B of the assembly. As will be understood the control system for controlling the jacks 9 may be any suitable system. Indeed, whilst the invention has been described in the context of an active heave compensation system, it should be understood that the invention may alternatively employ a passive system. Such control techniques are well understood by those skilled in the art.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The invention has been described with reference to the drawings in the context of lifting a load from the seabed. It should be understood that the invention may also be applied to the lowering of a load onto the seabed. Also, the lifting apparatus may itself be on the seabed or on a support resting on the seabed and the load may be floating.

In the example of the invention described with reference to the drawings, the sheave assembly comprises two sheaves; another possibility is for a winch to be secured to the main deck and for only the first sheave 7 to be provided. Another possibility is for there to be more sheaves guiding the rope around a more tortuous path.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A lifting apparatus for use in offshore lifting or lowering of a load, the lifting apparatus incorporating a heave compensation arrangement and comprising:
    a base part;
    a lifting rope extending from the base part for bearing at least some of the weight of the load;
    a sheave assembly mounted for pivotal movement about a fixed axis relative to the base part;
    a first sheave which is rotatably mounted on the sheave assembly, around which, in use, the rope passes and from which, in use, the rope extends downwardly for connection to the load;
    a second sheave which is rotatably mounted about an axis of rotation parallel to the axis of rotation of the first sheave;
    the sheave assembly being mounted for pivotal movement relative to the base part of the lifting apparatus about the fixed axis which is spaced from the axis of rotation of the first sheave and the fixed axis being coaxial with the axis of rotation of the second sheave, the relative movement resulting in movement of the axis of rotation of the first sheave relative to the base part in a direction having at least a major component that is vertical;
    a drive for moving the sheave assembly; and
    the apparatus being arranged such that in use during movement of the load relative to the base part of the lifting apparatus, the first sheave is moved by the drive to compensate for that relative movement, the movement of the first sheave being such that the vertical component of the movement of the first sheave relative to the load is less than the vertical component of the movement of the base part of the lifting apparatus relative to the load, wherein the first sheave is rotatable about a further independent axis of rotation.

2. A lifting apparatus according to claim 1, wherein the movement of the first sheave is such that the vertical component of the movement of the first sheave relative to the load is less than 30% of the vertical component of the movement of the base part of the lifting apparatus relative to the load.

3. A lifting apparatus according to claim 1, wherein the movement of the first sheave is such that the vertical component of the movement of the first sheave relative to the load is less than 5% of the vertical component of the movement of the base part of the lifting apparatus relative to the load.

4. A lifting apparatus according to claim 1, wherein the range of pivotal movement of the assembly includes a position at which the axis of rotation of the first sheave is at approximately the same level as the fixed axis of the sheave assembly.

5. A lifting apparatus according to claim 4, wherein the range of pivotal movement of the assembly includes a lowest position of the first sheave at which the axis of rotation of the first sheave is at approximately the same level as the fixed axis of the sheave assembly and a highest position at which the axis of rotation of the first sheave is above the fixed axis of the sheave assembly in two places.

6. A lifting apparatus according to claim 1, wherein the first and second sheaves have substantially the same diameter.

7. A lifting apparatus according to claim 1, wherein the drive for moving the sheave assembly comprises a piston and cylinder assembly.

8. A lifting apparatus according to claim 1, wherein the apparatus further comprises a control system for controlling the movement of the first sheave.

9. A lifting apparatus according to claim 1, wherein the first sheave provides the final direction-changing guide for the rope before the rope leaves the lifting apparatus.

10. A lifting apparatus according to claim 1, wherein the apparatus is mounted on a vessel.

11. A lifting apparatus according to claim 10, wherein the base part of the apparatus is fixedly mounted on a vessel.

12. A method for offshore lifting or lowering of a load with heave compensation, the method comprising the following steps:
providing the load to be lifted and a lifting apparatus that comprises: a base part; a lifting rope extending from the base part for bearing at least some of the weight of the load; a sheave assembly including a first sheave which is rotatably mounted on the sheave assembly, around which the rope passes and from which the rope extends downwardly and is connected to the load and a second sheave which is rotatably mounted on the sheave assembly and which has an axis of rotation parallel to the axis of rotation of the first sheave;
moving the first sheave upwardly and downwardly by pivoting the sheave assembly in about a substantially horizontal axis spaced from the axis of rotation of the first sheave and having an axis of pivoting that is coaxial with the axis of rotation of the second sheave to compensate for movement of the load relative to the base part of the lifting apparatus; and
controlling the movement of the rotatably mounted first sheave such that the vertical component of the movement of the first sheave relative to the load is less than the vertical component of the movement of the base part of the lifting apparatus relative to the load, wherein the first sheave is rotatable about a further independent axis of rotation.

13. A method according to claim 12, wherein the lifting apparatus is mounted on a floating vessel and the base part of the lifting apparatus moves up and down.

14. A method according to claim 12, wherein the load is resting on the seabed or on a structure resting on the seabed.

15. A method according to claim 12, wherein the load is floating or is on a floating vessel and moves up and down.

16. A method according to claim 12, wherein the range of pivotal movement of the sheave assembly includes a position at which the axis of rotation of the first sheave is at approximately the same level as the axis of pivoting of the assembly.

17. A method according to claim 16, wherein the range of pivotal movement of the assembly includes a lowest position of the first sheave at which the axis of rotation of the first sheave is at approximately the same level as the axis of pivoting of the sheave assembly and a highest position at which the axis of rotation of the first sheave is above the axis of pivoting of the sheave assembly.

18. A method according to claim 12, wherein the rope extends in a straight path from the first sheave to the load.

19. A method according to claim 18, wherein the straight path is substantially vertical.

* * * * *